(12) United States Patent
Hanaoka et al.

(10) Patent No.: US 7,337,891 B2
(45) Date of Patent: Mar. 4, 2008

(54) CLAMPING APPARATUS FOR WORKS

(75) Inventors: Tadashi Hanaoka, Mie (JP); Shuichi Maruyama, Mie (JP); Toshirou Higuma, Mie (JP); Yasuhiro Tokairin, Yamagata (JP)

(73) Assignees: Honda Motor Co., Ltd., Tokyo (JP); Kan Manufactory Co., Ltd., Yamagata (JP)

( * ) Notice: Subject to any disclaimer, the term of this patent is extended or adjusted under 35 U.S.C. 154(b) by 0 days.

(21) Appl. No.: 11/513,308

(22) Filed: Aug. 31, 2006

(65) Prior Publication Data
US 2007/0057135 A1   Mar. 15, 2007

(30) Foreign Application Priority Data
Sep. 1, 2005   (JP) .............................. 2005-253825

(51) Int. Cl.
*B65G 21/22* (2006.01)
(52) U.S. Cl. .................................. 198/345.1; 198/478.1
(58) Field of Classification Search ............. 198/469.1, 198/470.1, 474.1, 478.1, 465.1, 345.1, 345.2, 198/345.3
See application file for complete search history.

(56) References Cited

U.S. PATENT DOCUMENTS

| 2,415,997 | A | * | 2/1947 | Eldred | 198/470.1 |
|---|---|---|---|---|---|
| 4,080,730 | A | * | 3/1978 | Woodman, Jr. | 29/701 |
| 4,193,186 | A | * | 3/1980 | Boehler | 198/345.2 |
| 4,981,074 | A | * | 1/1991 | Machita et al. | 198/345.1 |
| 5,165,521 | A | * | 11/1992 | Schweitzer et al. | 198/345.2 |
| 5,282,524 | A | * | 2/1994 | Kakida et al. | 198/345.1 |
| 5,985,029 | A | * | 11/1999 | Purcell | 198/345.1 |

FOREIGN PATENT DOCUMENTS

JP   6-3541 U   1/1994

* cited by examiner

*Primary Examiner*—James R. Bidwell
(74) *Attorney, Agent, or Firm*—Birch, Stewart, Kolasch & Birch, LLP

(57) ABSTRACT

A clamping apparatus for works includes a base, a rotary table which is rotatable relative to the base and rotatively moved to one station after another for various processes, and a pallet unit which is arranged in accordance with the processes and holds a work having a reference hole. The pallet unit further includes a pallet which is provided with a plurality of positioning pins each to be inserted into the reference hole and corresponding to a plurality of kinds or types, and onto which the work is placed, a clamping mechanism part which holds the work by a pressing force of a spring, and a switching mechanism part which performs switching between the plurality of positioning pins. Further, the base is equipped with a clamp drive unit for operating the clamping mechanism part, a switch drive unit for operating the switching mechanism part, and a lift unit for moving the clamp drive unit and the switch drive unit toward and away from the pallet unit to engage with or disengage from the pallet unit.

7 Claims, 11 Drawing Sheets

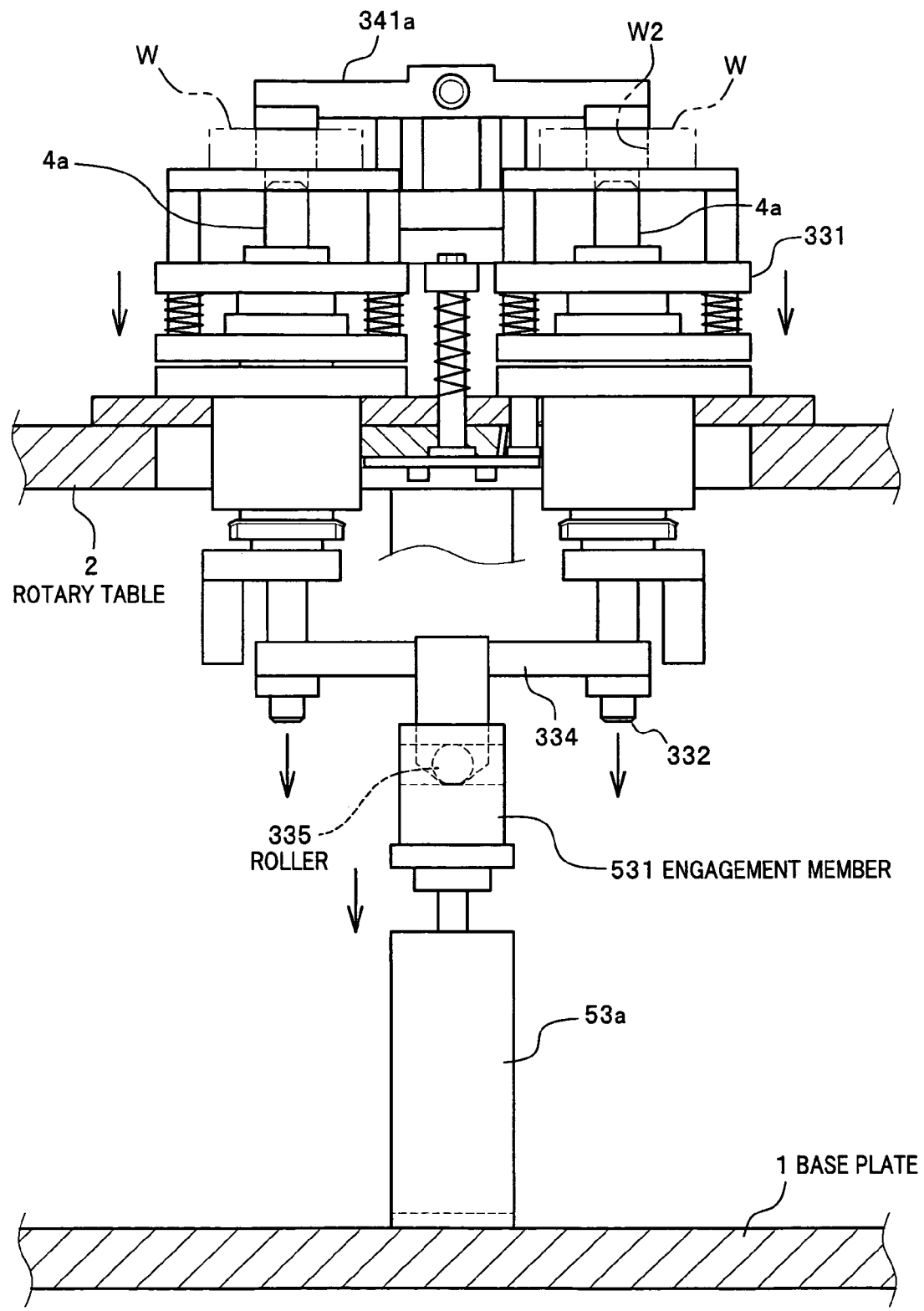

CLAMPING APPARATUS FOR WORKS

CROSS REFERENCE TO RELATED APPLICATIONS

This application claims the foreign priority benefit under Title 35, United States Code, §119(a)-(d) of Japanese Patent Applications No. 2005-253825 filed on Sep. 1, 2005 in the Japan Patent Office, the disclosure of which is herein incorporated by reference in its entirety.

BACKGROUND OF THE INVENTION

The present invention relates to a clamping apparatus for works, and more particularly to a clamping apparatus which can be used for different kinds of works.

To improve productivity, dedicated processing machines have been conventionally used in accordance with works to be machined. For example, there has been proposed a dedicated processing machine of a rotary table type, in which each of the pallets arranged on the rotary table clamps a work to be machined and the works are processed in order at a plurality of processes. In terms of ensuring positioning accuracy and stable clamping performance, such a processing machine generally includes a drive source (actuator) on the pallet so that the pallet can clamp a work in a reliable manner.

On the contrary, to simplify the structure, there has been proposed a pallet jig which can clamp a work only by the action of a spring and which does not require a drive source on the pallet. For example, Japanese Laid-open Utility Model Application No. Hei-6-3541 (paragraphs [0008] to [0012] and FIG. 1) discloses such a pallet jig.

However, providing a drive source on the rotary table arises the following drawbacks that a malfunction of the operation occurs or the durability deteriorates due to cutting fluid or cleaning liquid entering into the driving cylinder during the processing, and that the size of the whole processing machine increases.

Although the pallet jig disclosed in this Japanese Laid-open Utility Model Application No. Hei-6-3541 does not require a drive source on the pallet, there is a drawback that the pallet is not applicable to works having different sizes in accordance with different kinds or types.

In view of the above, the present invention seeks to provide a clamping apparatus for works, which is suitable for use with works having a reference hole, which contributes to downsize the apparatus, which improves the durability of the drive source, and further which can be switched for different kinds or types having a different reference hole.

SUMMARY OF THE INVENTION

According to a first aspect of the present invention, there is provided a clamping apparatus for works including: a base; a rotary table which is rotatable relative to the base and rotatively moved to one station after another for various processes; and a pallet unit which is arranged in accordance with the processes and holds a work having a reference hole. The pallet unit further includes: a pallet which is provided with a plurality of positioning pins each to be inserted into the reference hole and corresponding to a plurality of kinds or types, and onto which the work is placed; a clamping mechanism part which holds the work by a pressing force of a spring; and a switching mechanism part which performs switching between the plurality of positioning pins. Further, the base is equipped with a clamp drive unit for operating the clamping mechanism part, a switch drive unit for operating the switching mechanism part, and a lift unit for moving the clamp drive unit and the switch drive unit toward and away from the pallet unit to engage with or disengage from the pallet unit.

With this construction of the clamping apparatus, because the switching mechanism part which performs switching between the plurality of positioning pins is provided at the pallet for placing the work, the clamping apparatus can be adapted to a plural kinds of works having a different size of reference hole.

The switching mechanism part is provided at the pallet unit on the rotary table side, and the switch drive unit for operating the switching mechanism part is provided at the base. This makes it possible to reduce the size of the mechanism at the rotary table as well as to prevent drawbacks of the drive source due to cutting fluid or the like upon processing.

Further, the clamping mechanism part on the rotary table side holds the work by the pressing force of the spring, and so the clamping apparatus becomes simple in structure without requiring a drive source. Therefore, the mechanism at the rotary table becomes smaller, and it is possible to prevent a malfunction of the operation of the drive source due to cutting fluid or the like upon processing.

Furthermore, the clamp drive unit and the switch drive unit are moved by the lift unit toward and away from the pallet unit to thereby engage with or disengage from the pallet unit. Therefore the clamp drive unit and the switch drive unit can be operated at a predetermined station where necessary.

In the aforementioned clamping apparatus for works, the clamp drive unit and the switch drive unit may be engaged with or disengaged from the pallet unit at a loading/unloading station for the works.

With this construction of the clamping apparatus, operating the clamping mechanism part upon loading/unloading the work makes it possible to clamp or unclamp the work. Further, operating the switching mechanism part for different kinds or types makes it possible to switch over to the positioning pin in accordance with a desired kind or type of work.

The clamping apparatus for works as describe above may further includes: a holder which supports the positioning pins on the pallet such that one of the positioning pins is inserted into or pulled out from the reference hole of the work; a support spring for urging the holder in a direction where the positioning pin is inserted into the reference hole of the work; an engagement strip joined to or extending from the holder; an engagement member arranged at the base to be engageable with the engagement strip at a predetermined station; and an engagement member drive unit coupled with the engagement member and mounted on the base, the engagement member drive unit moving the engagement member in a direction to pull out the positioning pin from the reference hole.

With this construction of the clamping apparatus, the engagement member drive unit is engaged with the engagement strip, which is joined to or extending from the holder for holding the positioning pins, through the engagement member at a predetermined station, so that the positioning pin is moved in a direction to be pulled out from the reference hole. This makes it possible to readily perform the processing from the inner surface side of the reference hole when compared with the case in which the positioning pin is inserted into the reference hole of the work.

Further, the engagement member drive unit is mounted on the base and is engageable at a predetermined station where necessary such that the positioning pin is pulled out from the reference hole of the work. Therefore, the mechanism provided at the rotary table becomes smaller, and it is possible to prevent a malfunction of the operation of the drive source due to cutting fluid or the like upon processing.

In the aforementioned clamping apparatus for works, the pallet may further comprise a movable pallet for receiving that portion of the work which has the reference hole, and a stationary pallet for receiving that portion of the work which does not have the reference hole, and the plurality of positioning pins may be provided at the movable pallet.

With this construction of the clamping apparatus, the pallet separately includes the movable pallet onto which is placed that portion of the work which has the reference hole to be different according to the kinds or types of works, and the stationary pallet onto which is placed that portion of the work which does not have the reference hole and to be common in all the different kinds or types of works. Therefore, instead of switching the pallet entirely, it is possible to merely switch the movable pallet. This contributes to reduce the size of the switching mechanism part as well as to simplify the structure thereof.

In the aforementioned clamping apparatus, the work may be a connecting rod, and the reference hole of the work may be a small-end hole of the connecting rod.

Connecting rod has a small-end hole and a big-end hole, and highly accurate processing is required for the positional relation between these end holes, processing of the end holes and the oil holes thereon, etc. Being the small-end hole as the reference hole, positioning is readily made and the processing accuracy is ensured when the small-end hole is considered as the reference. Further, even if the inner diameter of the small-end hole of the connecting rod is different among different kinds or types of engines, switching the positioning pin to another desired kind or desired type of engine makes it possible to adjust the works for different kinds or types.

In the aforementioned clamping apparatus, the clamping mechanism part may include a clamp arm for urging and holding the work against the pallet by a pressing force of a spring, and clamping claws for clamping and holding the work by a pressing force of a spring so as to prevent a rotation of the work around the reference hole as a rotation axis.

With this construction of the clamping apparatus, positioning the reference hole as the starting point or origin and further holding the work with the clamping claws so as to prevent a rotation of the work around the reference hole as the rotation axis make it possible to accurately and readily perform positioning and clamping of works having a reference hole.

Further, restricting a rotation of the work without providing a restriction for the longitudinal direction of the work makes it possible to readily adjust the clamping apparatus for different kinds or different types of works having a different length.

In the aforementioned clamping apparatus, the switching mechanism part may support the plurality of positioning pins rotatably on a circle and have an engagement strip which is rotatable together with the plurality of positioning pins, and further the switch drive unit may comprise an engagement member which is engageable with the engagement strip, and a switch drive source for rotating the engagement member.

With this construction of the clamping apparatus, the switch drive unit engages with the pallet unit, thereby engaging the engagement member with the engagement strip, so that rotating the engagement member by the switch drive unit causes the switching mechanism part to be operated. This makes it possible to reduce the size of the mechanism at the rotary table with a simple structure as well as to prevent a malfunction of the operation of the drive source due to cutting fluid or the like upon processing.

Other features and advantages of the present invention will be apparent from the following detailed description with reference to the accompanying drawings.

BRIEF DESCRIPTION OF THE DRAWINGS

The aspects of the present invention will become more apparent by describing in detail illustrative, non-limiting embodiment thereof with reference to the accompanying drawings, in which:

FIGS. 9A and 9B are sectional views of a main part of the clamping apparatus viewing the clamping claws mechanism shown in FIG. 7 from the direction of "Z", in which FIG. 9A shows a clamping state and FIG. 9B shows an unclamping state;

FIGS. 10A and 10B show an engagement member drive unit for the positioning pins of the clamping apparatus, in which FIG. 10A is a partly enlarged view as viewing from the direction of "X" of FIG. 1 and FIG. 10B is a partly enlarged view as viewing from the direction of "Y" of FIG. 1; and FIG. 11 is a partly enlarged view of the clamping apparatus viewing from the direction of "Y" of FIG. 1 and explaining operation of the positioning pin for inserting into and pulling out from the reference hole of the work.

DESCRIPTION OF THE PREFERRED EMBODIMENT

One preferred embodiment of the present invention will be described with reference to the accompanying drawings.

Figure 2:
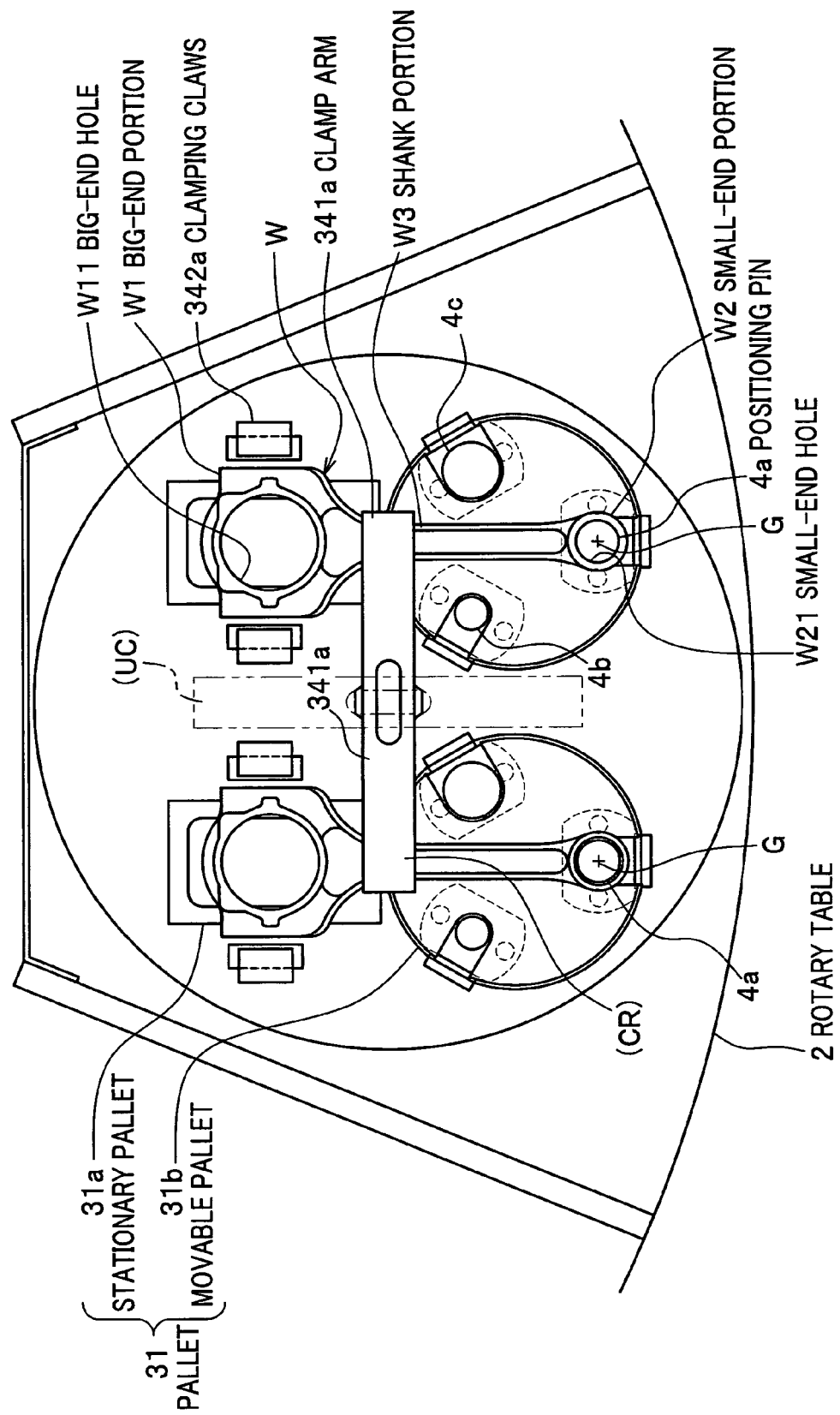
FIG. 2 is a top plan view of the clamping apparatus showing a state in which works are placed on the pallet.

As shown in FIG. 2, a clamping apparatus will be described below as an example used for works which are connecting rods of engine.

Figure 1:
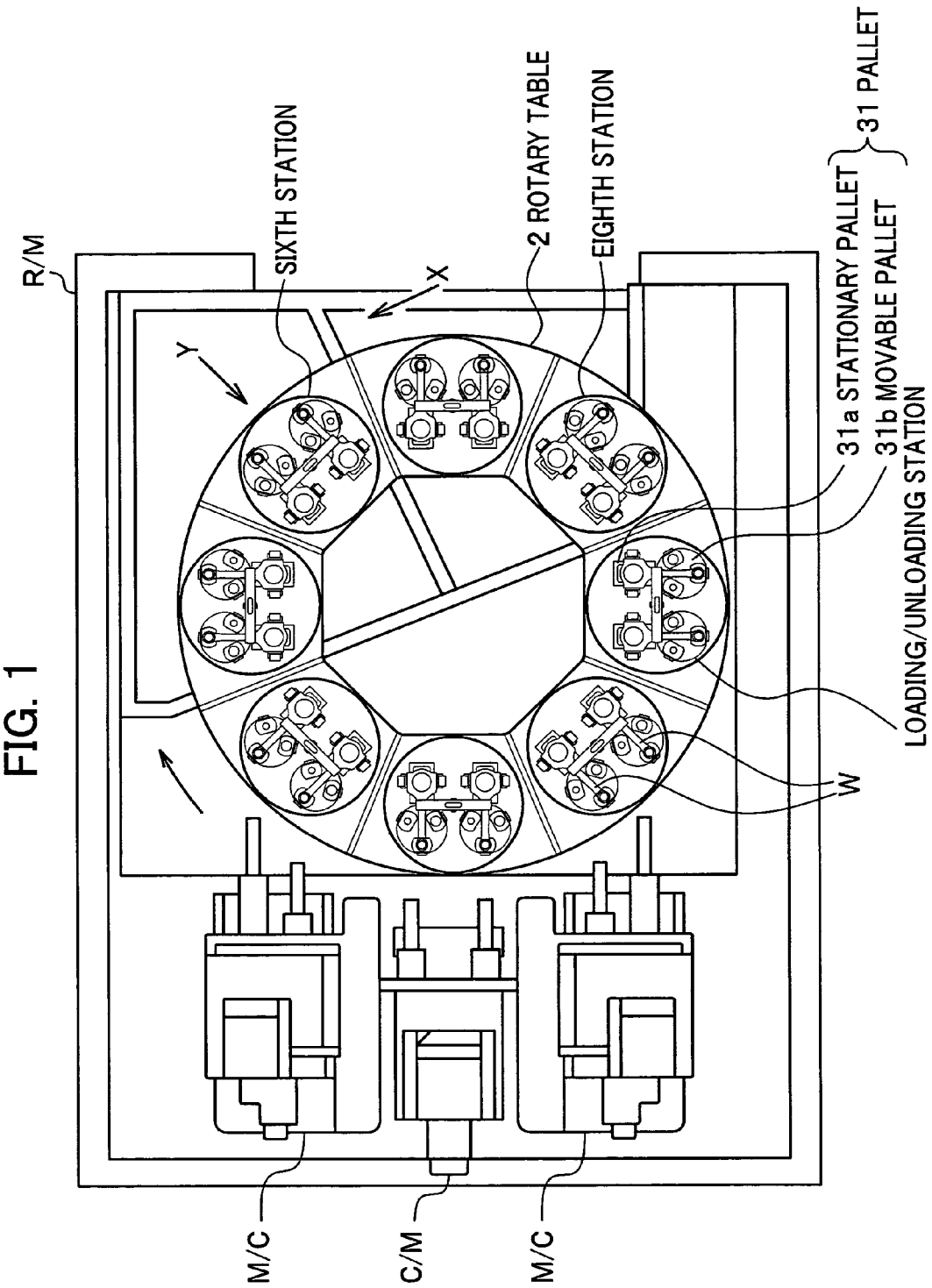
FIG. 1 is a top plan view of a clamping apparatus for works according to one embodiment of the present invention particularly showing the configuration around a rotary table.

As shown in FIG. 1, the clamping apparatus for works is adapted for a rotary table-type processing machine R/M. The processing machine R/M includes a rotary table 2 which is rotatable relative to a base plate 1 as a base (see FIG. 3) and rotatively moved to one station after another for various processes, and pallets 31 arranged on the rotary table 2 in accordance with the processes. Each pallet 31 clamps a connecting rod W as a work. Processes at the stations are carried out in order from a loading/unloading station as a first station and in a clockwise direction to the subsequent stations. Each of the stations includes, where necessary, a processing machine M/C for oil holes or oil grooves and for chamfering, etc. as well as a cleaning machine C/M and the like.

As an example, in the rotary table-type processing machine R/M employing the clamping apparatus according to the present invention, the loading station and the unloading station are commonly provided at the first station, and a robot (not shown) performs to load and unload works W. In the sixth station and the eighth station, deburring of the oil holes and cleaning are carried out from the inner diameter side of a small-end hole W21 of the work W (see FIG. 2). Other stations except for these sixth and eighth stations are not so important, and explanation thereof will be omitted.

As shown in FIG. 2, a connecting rod W as a work has an elongated gourd shape as viewed from top including a big-end portion W1, a small-end portion W2, and a shank portion W3 connecting the big-end portion W1 and the small-end portion W2. A big-end hole W11 is formed in the big-end portion W1 for inserting a crank pin of the engine (not shown) whereas a small-end hole W21 is formed in the small-end portion W2 for inserting a piston pin of the engine (not shown). The small-end hole W21 is a reference hole of the connecting rod W. Inserting the small-end hole W21 of the connecting rod W relative to a positioning pin 4*a* arranged on the pallet 31, onto which is placed the connecting rod W, causes the connecting rod W to be positioned in a predetermined reference position G.

The connecting rod W is retained on the pallet 31 by means of the positioning pin 4*a* inserted into the small-end hole W21, a clamp arm 341*a* for urging the shank portion W3 from above against the pallet 31 to retain the shank portion W3, and clamping claws 342*a* for clamping the big-end portion W1 at both ends of the big-end portion W1. As described later, the clamp arm 341*a* is rotatable by 90 degrees from a clamping position CR to an unclamping position UC.

In this embodiment, two pallets 31, 31 are arranged side by side for one station to thereby place two connecting rods W, W. However, the construction of each pallet 31 is substantially identical, and thus explanation will be given only to one pallet 31 in the following description.

Although two pallets 31, 31 are arranged for one station in this embodiment, the present invention is not limited to this specific arrangement. For example, only one pallet 31 may be arranged for one station. Connecting rods W, W may be of different kinds or different types as well as of the same kind or the same type. Further, considering the layout of the processing machine M/C, etc, the pallets 31, 31 may be arranged, for example, in a lateral symmetrical manner.

Figure 3:
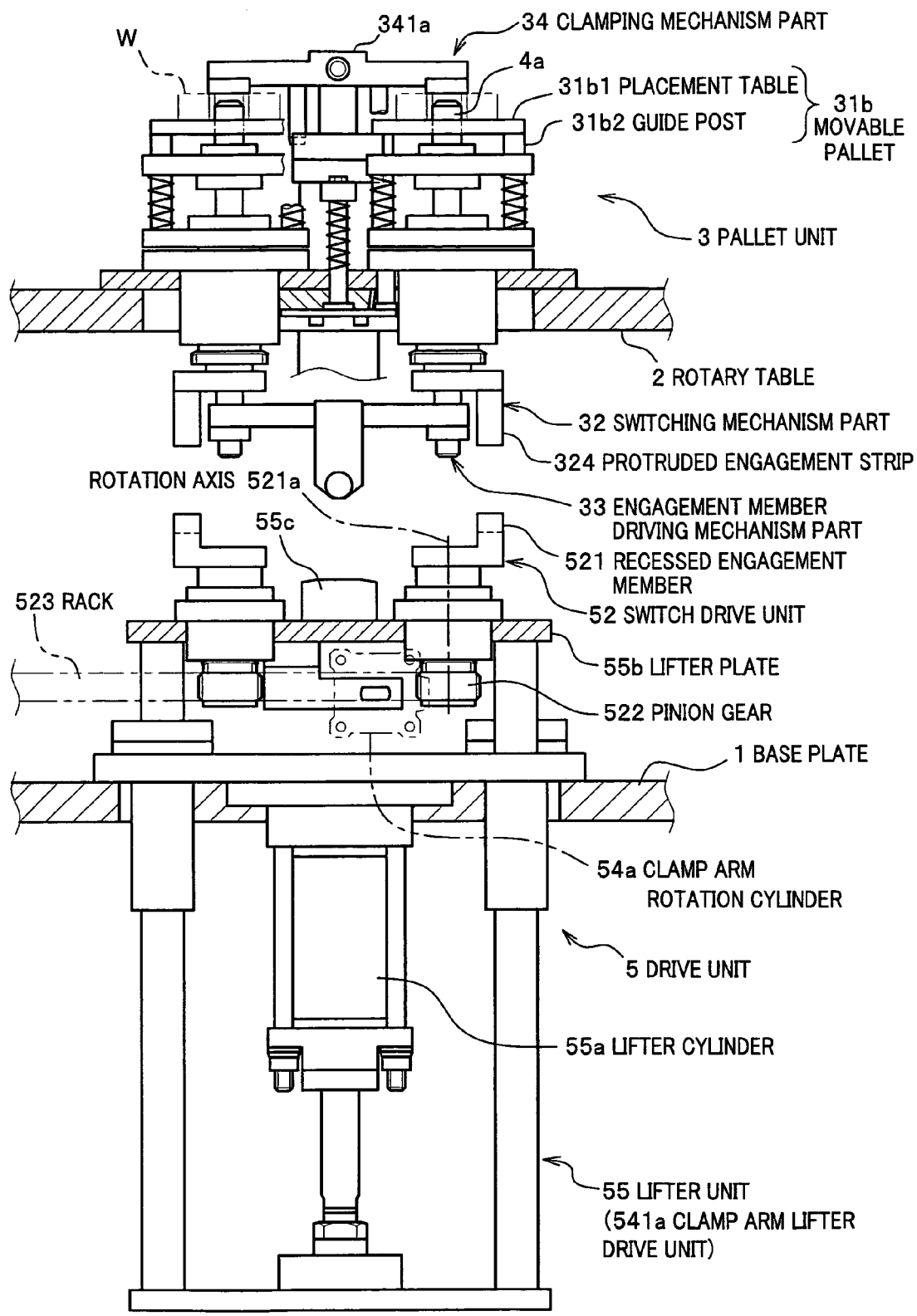
FIG. 3 is a sectional view of the clamping apparatus showing a state in which the engagement between the drive unit and the pallet unit is released.

As shown in FIG. 3, the clamping apparatus for works includes the base plate 1 as the base, the rotary table 2 as described above, a pallet unit 3 for retaining connecting rods W and arranged corresponding to the processes of the rotary table 2, and a drive unit 5 provided at the base plate 1 to be engageable with and disengageable from the pallet unit 3.

The pallet unit 3 includes pallets 31 (see FIG. 2) each for placing thereon a connecting rod W as a work, a switching mechanism part 32 (see FIG. 3) for switching the positioning pins 4*a*, 4*b*, and 4*c*, the engagement member driving mechanism part 33 for inserting and pulling out the positioning pin 4*a*, 4*b*, 4*c* into and from the connecting rod W, and a clamping mechanism part 34 (see FIG. 7) for retaining the connecting rod W by the pressing force of a spring.

As one example shown in FIG. 2, the pallet 31 is divided into and consists of a stationary pallet 31*a* for placing thereon the big-end portion W1 of the connecting rod W, and a movable pallet 31*b* for placing thereon the small-end portion W2 of the connecting rod W.

The stationary pallet 31*a* is formed to have a rectangular frame shape as viewed from top, and the center part of the stationary pallet 31*a* corresponding to the inner area of the big-end hole W11 penetrates through the big-end hole W11. The movable pallet 31*b* is formed to have a circular shape as viewed from top and is rotatable relative to the rotary table 2 together with the positioning pins 4*a*, 4*b*, and 4*c* which are arranged on a circle.

Figure 5:
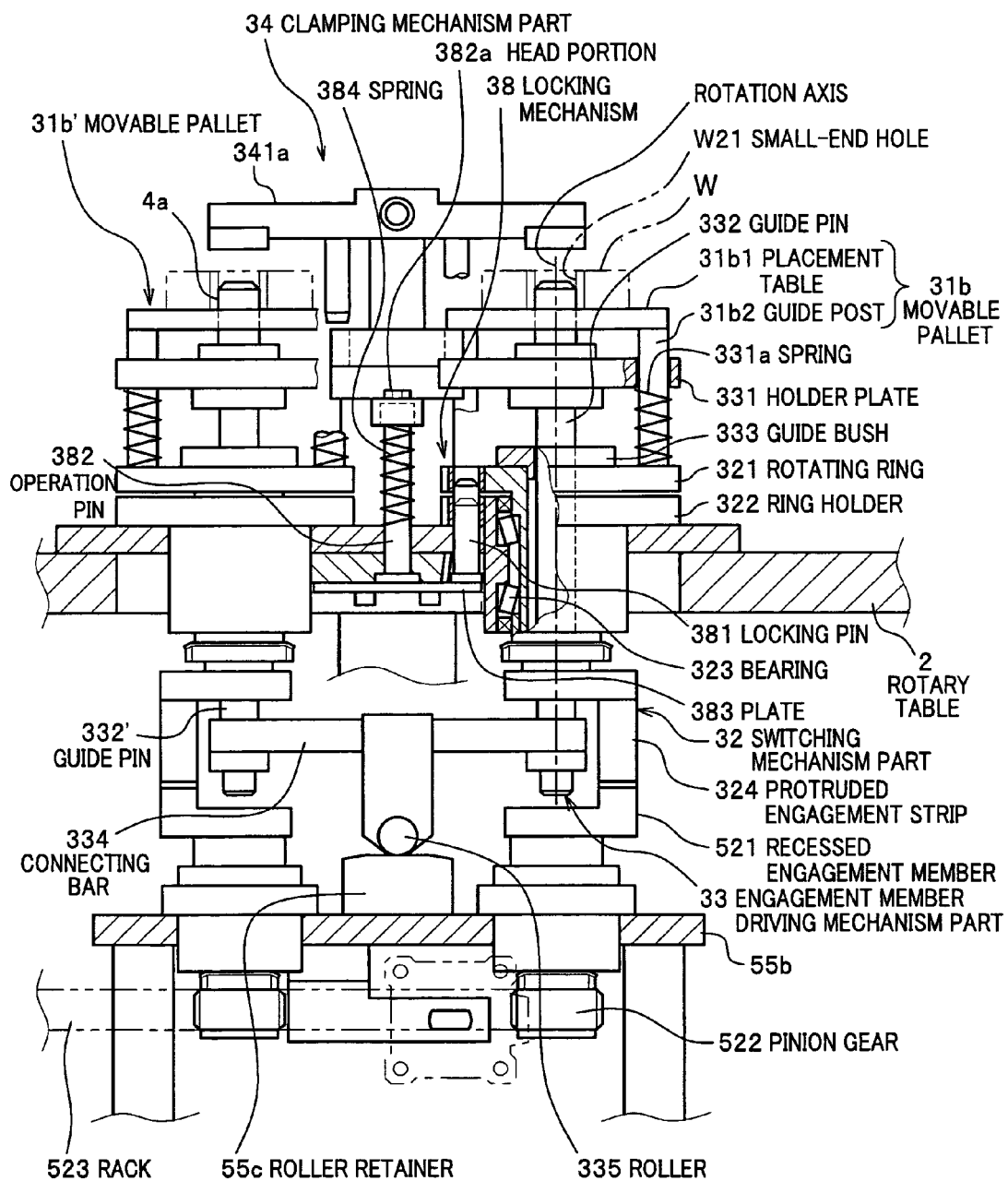
FIG. 5 is a sectional view showing a main part of the clamping apparatus around the movable pallet.

Further, as shown in FIG. 5, the movable pallet 31*b* has a placement table 31*b*1 and a guide post 31*b*2. The guide post 31*b*2 projects on a rotating ring 321 to be described later and the placement table 31*b*1 is provided on the upper part of the guide post 31*b*2.

Figure 6:
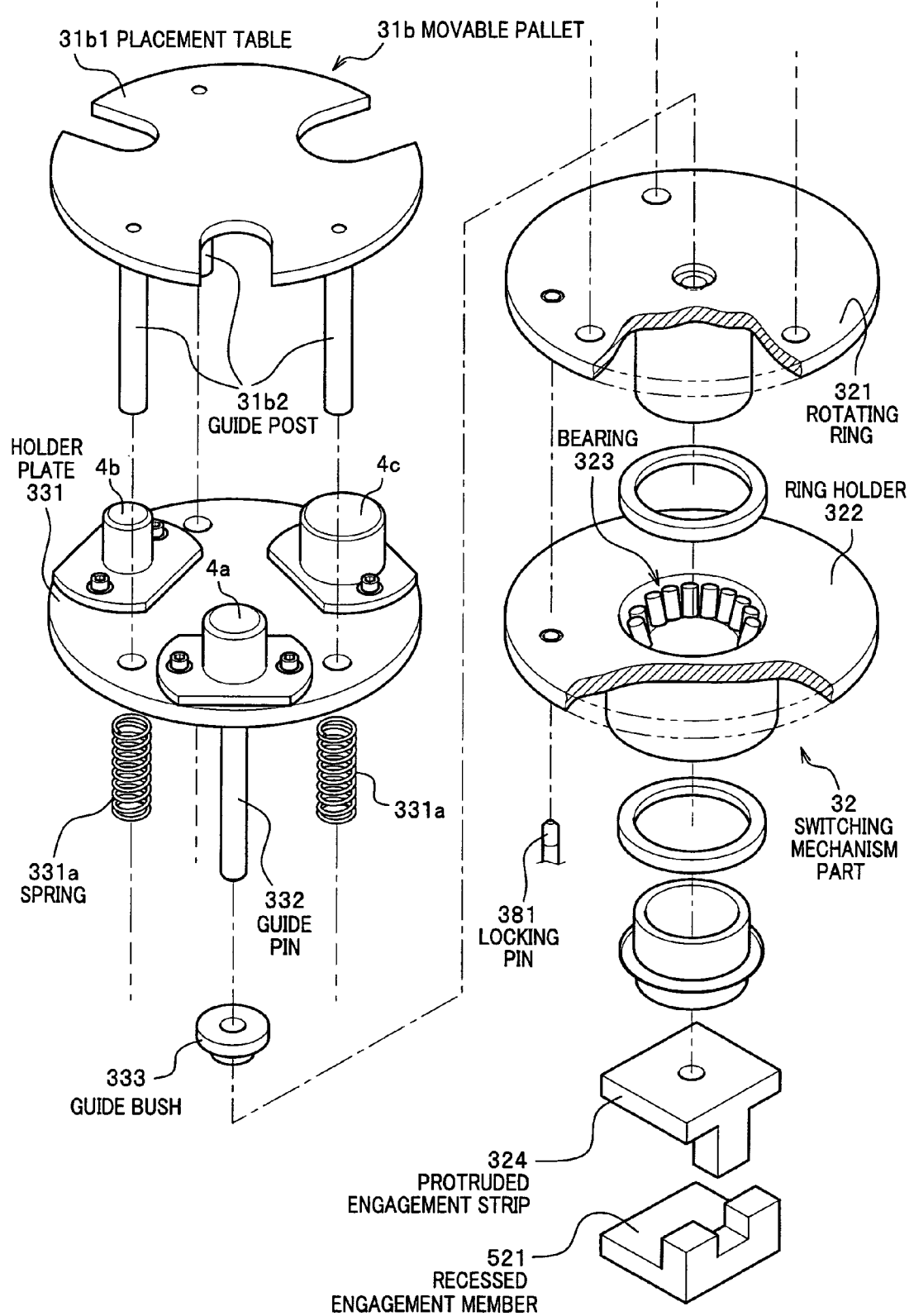
FIG. 6 is an exploded perspective view of the clamping apparatus around the movable pallet.

The switching mechanism part 32 for the positioning pins can rotate the positioning pin 4*a* and the movable pallet 31*b* together as shown in FIG. 6, so that switching of the positioning pin 4*a* is performed. The switching mechanism part 32 includes the rotating ring 321 which is rotatably fitted into the rotary table 2 (see FIG. 5) through a bearing 323 and a ring holder 322, and a protruded engagement strip 324 as an engagement strip which is provided below the rotating ring 321 in such a position offset from the rotation axis of the rotating ring 321.

The protruded engagement strip 324 is engageable with a recessed engagement member 521 to be described later so that they are integrally rotatable. When a rack 523 is reciprocated by a switching cylinder 52*a* (see FIG. 8), the recessed engagement member 521 rotates through a pinion gears 522 to thereby rotate the movable pallet 31*b* and to perform the switching of the positioning pin 4*a*.

As seen in FIG. 5, the movable pallet 31*b* is provided with a locking mechanism 38 which prevents an unintentional rotation of the movable pallet 31*b* during the processing of the connecting rod W.

The locking mechanism 38 for the positioning pins 4*a*, 4*b*, and 4*c* is constructed such that the rotating ring 321 which is rotatable and the ring holder 322 which is fixed to the rotary table 2 are coupled together through a locking pin 381 to prevent a rotation of the rotating ring 321 as shown in FIG. 6.

To be more specific, the lower end of the locking pin 381 and the lower end of an operation pin 382 for the insertion and pulling out of the locking pin 381 are fixed to a plate 383, and using a spring 384, the operation pin 382 is urged by the spring 384 in the upward direction where the locking mechanism 38 of the locking pin 381 actuates to perform locking.

The engagement member driving mechanism part 33 for the positioning pins moves down a holder plate 331 onto which are mounted the positioning pins 4*a*, 4*b*, and 4*c* (see FIG. 6) relative to the placement table 31*b*1 for placing the connecting rod W, so that the positioning pin 4*a* is pulled out from the connecting rod W. As shown in FIG. 5, the engagement member driving mechanism part 33 includes a guide pin 332 extending downward from the bottom surface of the holder plate 331, a guide bush 333 for supporting the guide pin 332 in such a manner to be movable in the vertical direction relative to the rotary table 2, and a roller 335 as an engagement strip which is provided below the guide pin 332 through a connecting bar 334. The connecting bar 334 also connects a guide pin 332' of another movable pallet 31b'.

To be more specific, the holder plate 331 onto which are arranged the positioning pins 4a, 4b, and 4c is supported by guide posts 31b2 in such a manner as to be movable in the vertical direction, and by springs 331a the holder plate 331 is urged in the direction where the locking pins 4a is inserted into the connecting rod W. As long as an external force is not applied, the positioning pin 4a rotates for each process while being inserted into the connecting rod W.

The guide pin 332 is fixed to the bottom surface of the holder plate 331 and extends toward the lower end of the rotary table 2. The guide pin 332 is supported by the guide bush 333 and is vertically movable. The roller 335 is rotatably fixed to the guide pin 332 through the connecting bar 334.

When the roller 335 reaches the sixth station, an engagement member 531 (see FIG. 10) to be described later comes into engagement with the roller 335. Therefore, moving the engagement member 531 in the downward direction causes the positioning pin 4a to be pulled out from the connecting rod W.

Figure 7:
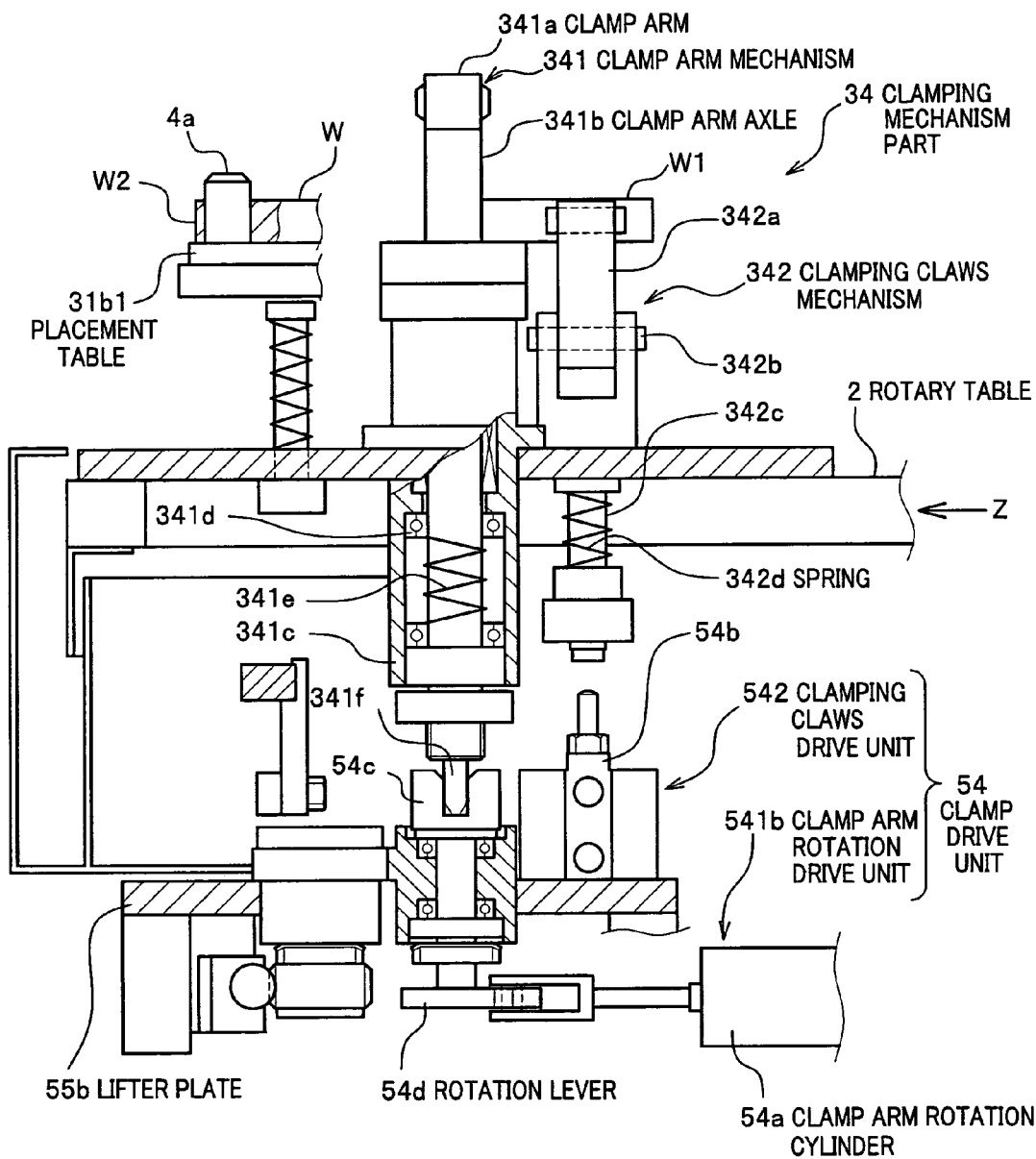
FIG. 7 is a sectional view of a main part of the clamping apparatus explaining the clamping mechanism part.
Figure 8:
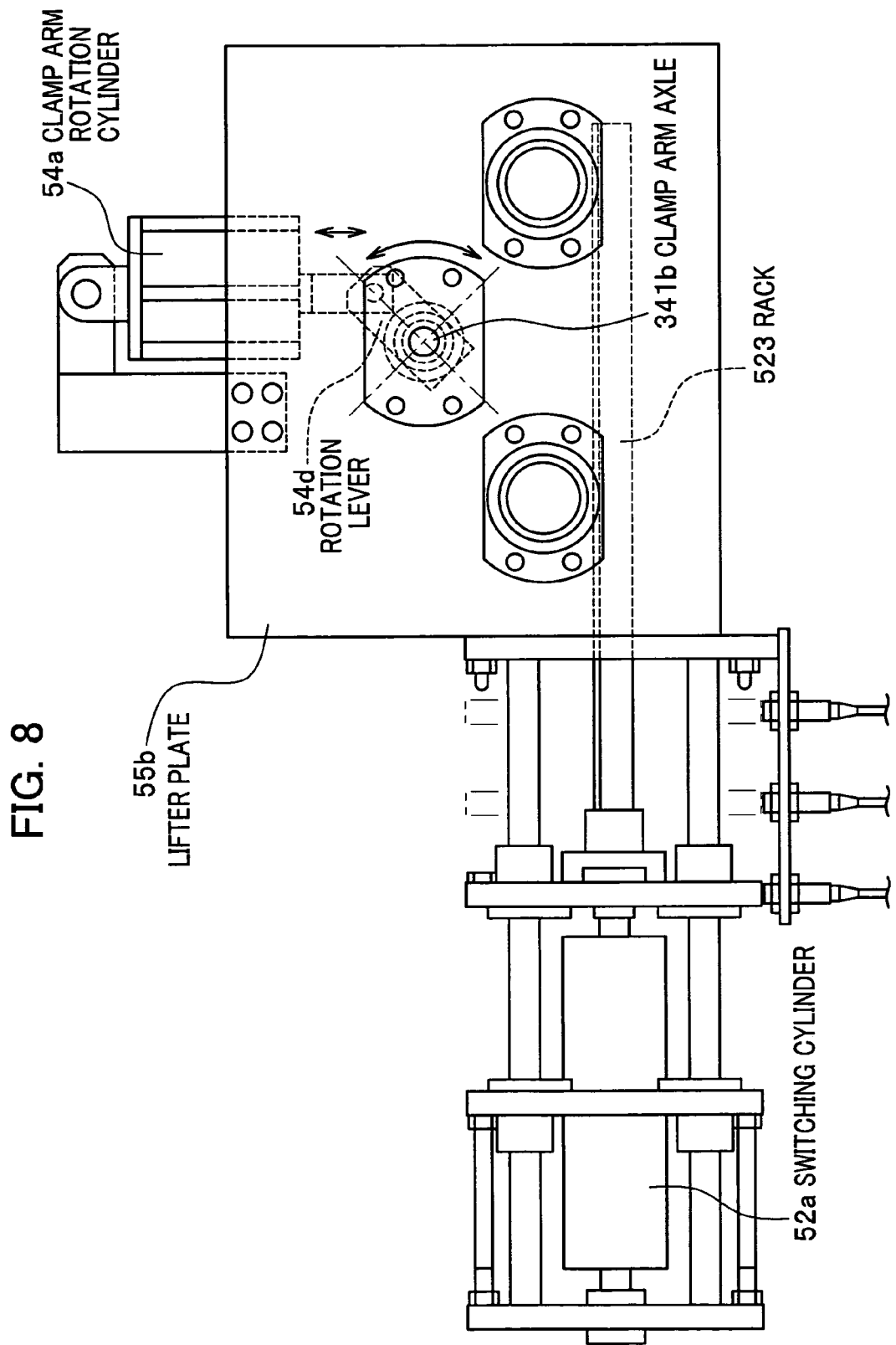
FIG. 8 is a plan view showing the drive unit of the clamping apparatus.

With reference to FIGS. 7 to 9, the clamping mechanism part will be described below.

As shown in FIG. 7, the clamping mechanism part 34 includes a clamp arm mechanism 341 which urges the shank portion W3 of the connecting rod W (see FIG. 2) from above against the pallet 31 to clamp the connecting rod W, and a clamping claws mechanism 342 which clamps the connecting rod W at both ends of the big-end portion W1.

As seen in FIG. 7, the clamp arm mechanism 341 includes a clamp arm axle 341b which is vertical relative to the rotary table 2 and is freely rotatable as well as movable in the vertical direction, the clamp arm 341a which is fixed to the upper end of the clamp arm axle 341b and clamps the connecting rod W from above, a guide holder 341c which supports the clamp arm axle 341b through a bearing 341d so as to allow the clamp arm axle 341b to be freely rotatable as well as slidable in the vertical direction, a spring 341e urging the clamp arm axle 341b in the downward direction, and a protruded engagement strip 341f as an engagement strip which is joined to the lower end of the clamp arm axle 341b.

The clamp arm mechanism 341 is constructed such that the clamp arm 341a is urged by the spring 341e to press and hold the connecting rod W and that the clamp arm 341a is lifted and rotated by 90 degrees to release the connecting rod W.

To be more specific, the clamp arm 341a consists of a plate-like member which is arranged at the center of and at above the two connecting rods W (see FIG. 2). As shown in FIG. 7, at the time of clamping, the spring 341e urges the clamp arm axle 341b in the downward direction to thereby press and hold the connecting rod W against the placement table 31b1. On the contrary, at the time of unclamping, a lifter cylinder 55a (see FIG. 3) is elevated so that a recessed engagement member 54c provided on a lifter plate 55b engages with the protruded engagement strip 341f joined to the lower end of the clamp arm axle 341b, thereby elevating the clamp arm 341a.

The protruded engagement strip 341f has an engagement portion in the form of a plate, which is fitted into a corresponding engagement portion of the recessed engagement member 54c. Because the protruded engagement portion of the protruded engagement strip 341f is fitted into the recessed engagement portion of the recessed engagement member 54c and they are rotated together, when a clamp arm rotation drive unit 541b to be describe later operates, the protruded engagement strip 341f rotates through the recessed engagement member 54c. Therefore, rotating the clamp arm 341a by 90 degrees to the unclamping position UC (see FIG. 2) where the clamp arm 341a becomes parallel to the connecting rod W causes the connecting rod W to be released.

As shown in FIG. 2, the clamping claws mechanism 342 clamps the big-end portion W1 of the connecting rod W by the pressing force of the spring so as to prevent a rotation of the connecting rod W around the positioning pin 4a being a rotation axis while the positioning pin 4a is inserted into the small-end hole W21 as the reference hole.

Figure 9A:
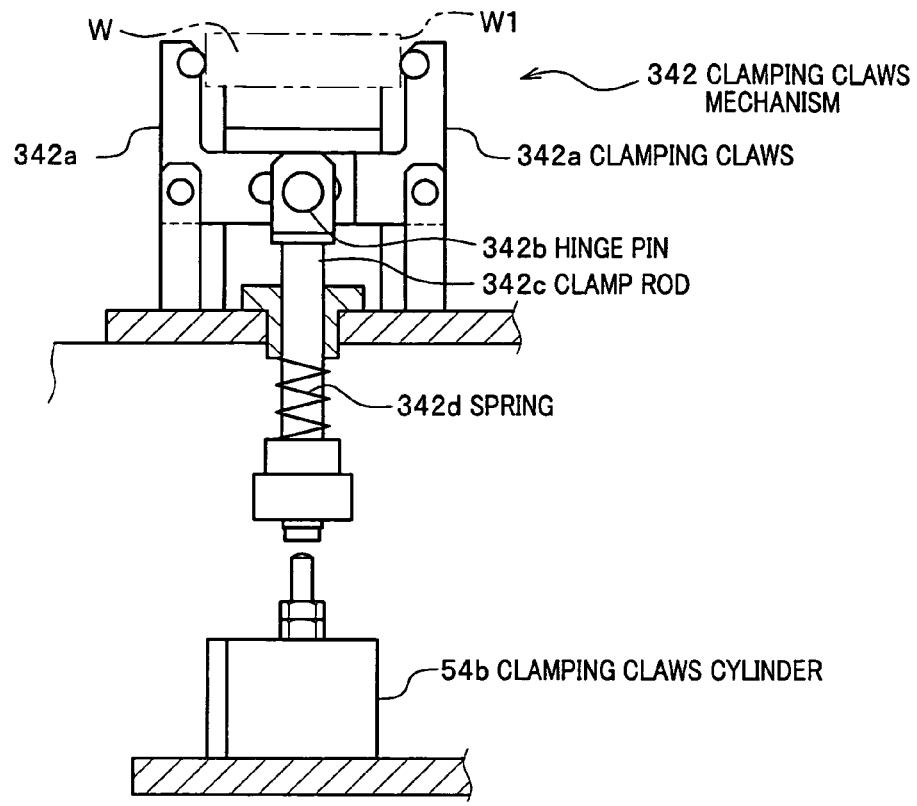
Figure 9B:
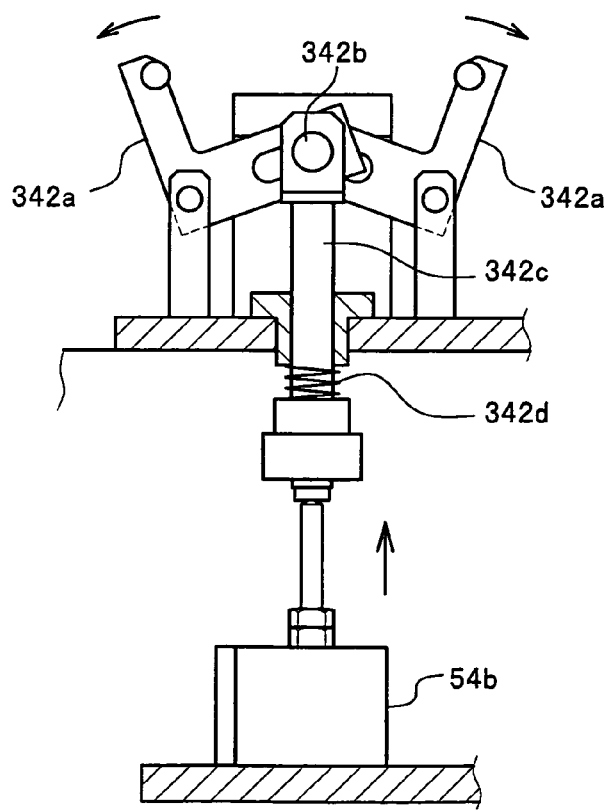

To be more specific, as shown in FIG. 9A, two clamping claws 342a, 342a each made of an L-shaped angle bar are arranged symmetrically to face each other, and the lower ends of the clamping claws 342a, 342a are connected by a hinge pin 342b. The hinge pin 342b is further connected to a clamp rod 342c onto which is fitted a spring 342d for urging the clamp rod 342c in the direction where the clamping claws 342a, 342a are closed. With this construction, the clamping claws 342a, 342a can clamp the big-end portion W1 of the connecting rod W. As shown in FIG. 9B, when the clamp rod 342c is elevated by a clamping claws cylinder 54b to be described later, the connecting rod W is unclamped.

By the way, as shown in FIG. 3, the clamping mechanism part 34, the switching mechanism part 32, and the drive unit 5 for operating the engagement member driving mechanism part 33, which are mechanism parts installed on the rotary table 2 side, are arranged toward the base plate 1.

The drive unit 5 includes a switch drive unit 52 for operating the switching mechanism part 32, an engagement member drive unit 53 (see FIG. 10) for moving the positioning pin 4a in the direction where the positioning pin 4a is pulled out from the connecting rod W, a clamp drive unit 54 (see FIG. 7) for operating the clamping mechanism part 34, and a lifter unit 55 for operating the clamp drive unit 54 and the switch drive unit 52 such that they are moved toward and away from the pallet unit 3 to engage with and disengage from the pallet unit 3.

As shown in FIG. 3, the switch drive unit 52 includes the recessed engagement member 521 rotatably provided on the lifter plate 55b through a bearing (not shown), a pinion gear 522 provided coaxially with a rotation axis 521a of the recessed engagement member 521, a rack 523 meshed with the pinion gear 522, and the switching cylinder 52a (see FIG. 8) for reciprocating the rack 523 in the to-and-fro direction.

Therefore, when the lifter plate 55b is elevated by the lifter cylinder 55a to be described later, the switching cylinder 52a operates, while the protruded engagement strip 324 and the recessed engagement member 521 are engaged, to reciprocate the rack 523, so that the protruded engagement strip 324 rotates to thereby rotate the movable pallet 31b in the end (see FIG. 6).

With reference to FIGS. 10 and 11, the engagement member drive unit 53 for the positioning pins will be described.

Figures 10A, 10B:
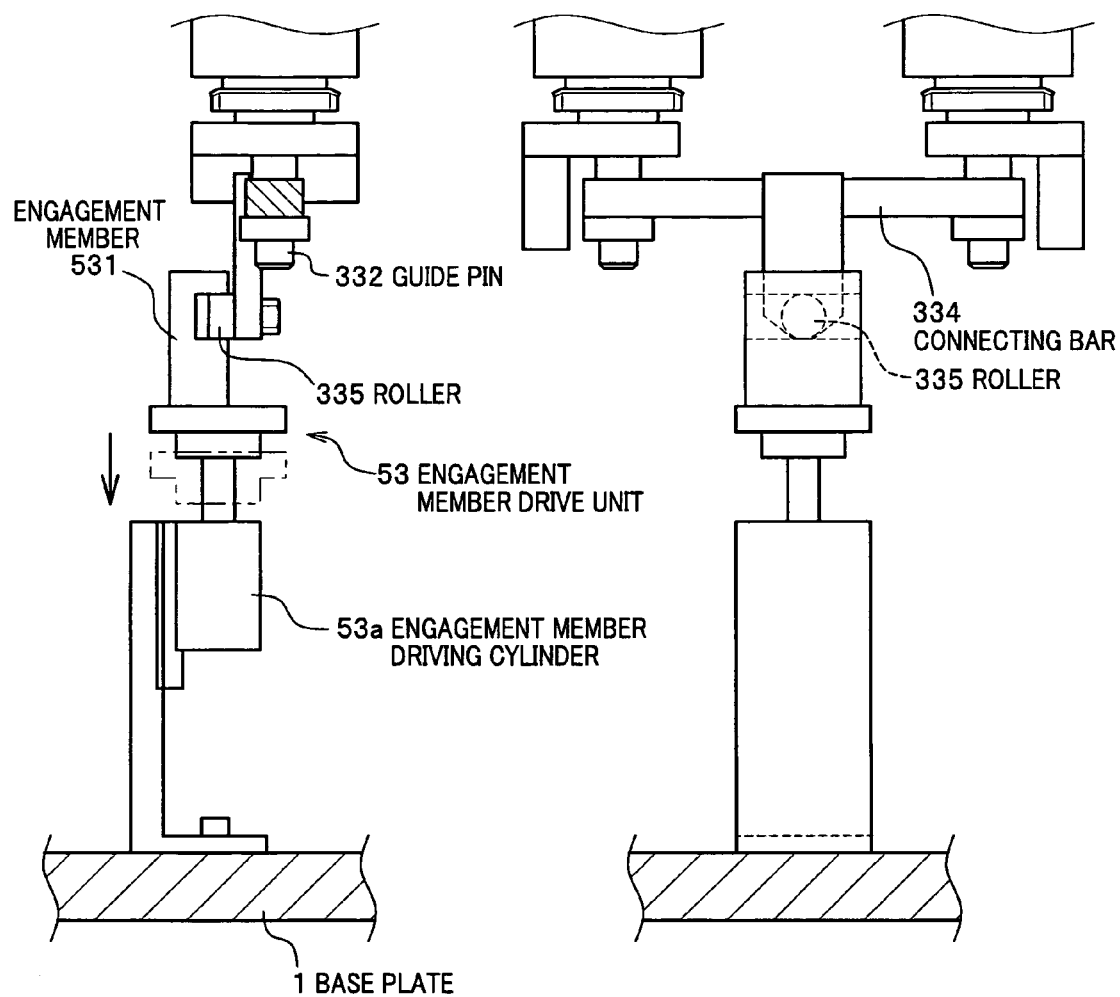

The engagement member drive unit 53 for the positioning pins is provided at the sixth station and the eighth station (see FIG. 1) respectively on the base plate 1 side. As shown in FIGS. 10A and 10B, the engagement member drive unit 53 includes an engagement member 531 engageable with the roller 335, and an engagement member driving cylinder 53a as the engagement member drive unit which is coupled with the engagement member 531.

With this construction, when the engagement member driving cylinder 53a operates to move down the engagement member 531 with the roller 335 engaged with the engagement member 531, the positioning pin 4a is pulled out from the connecting rod W.

To be more specific, the engagement member 531 is arranged on the base plate 1 in such a position as to be engageable with the roller 335, which is positioned below the guide pin 332 through the connecting bar 334, at a time when the roller 335 reaches the sixth station and the eighth station by rotatively moving the rotary table 2.

Further, as shown in FIG. 11, the engagement member driving cylinder 53a coupled with the engagement member 531 moves down the engagement member 531 while the engagement member 531 is engaged with the roller 335, so that the positioning pin 4a is pulled out from the connecting rod W.

Figure 4:
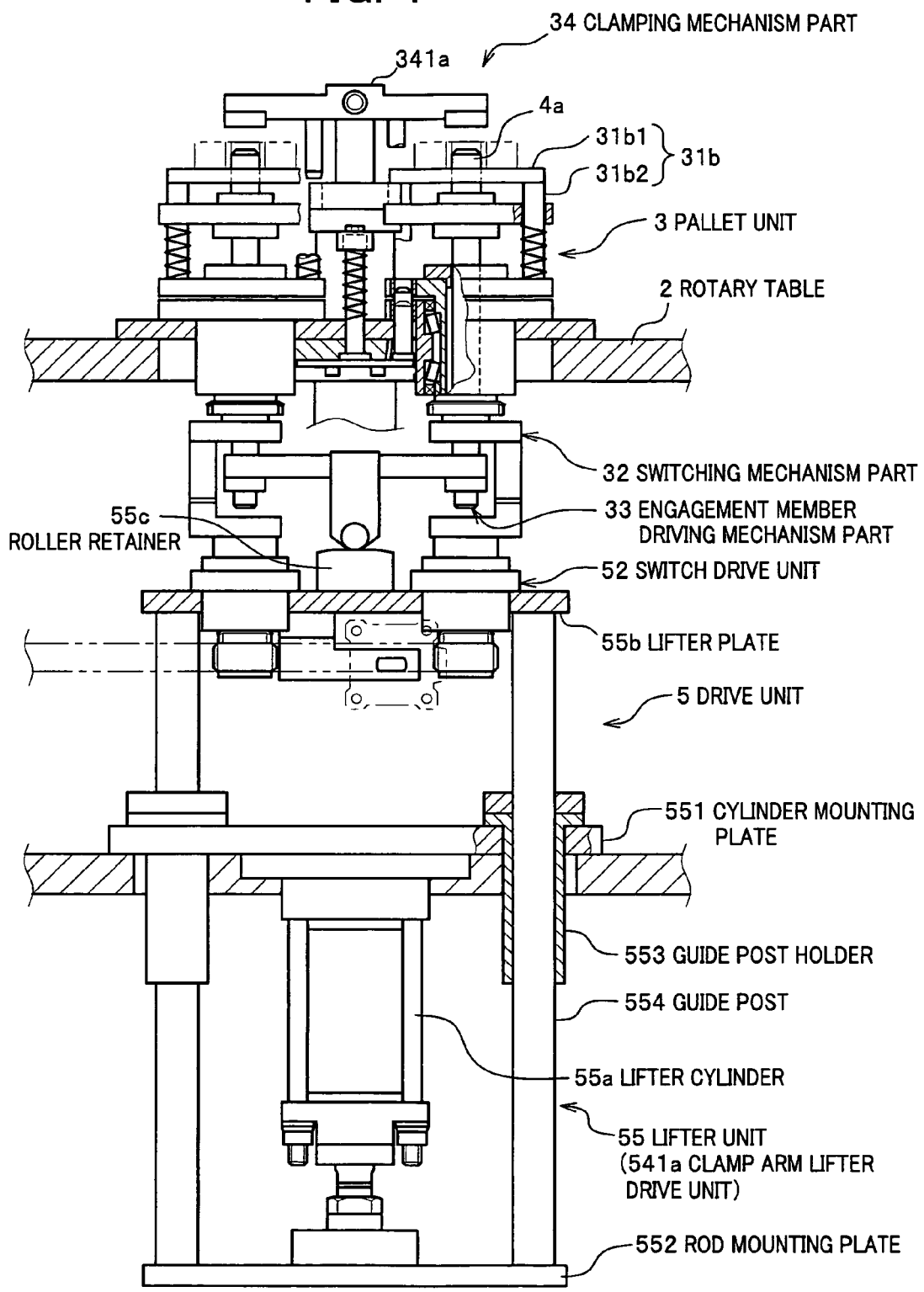
FIG. 4 is a sectional view of the clamping apparatus showing a state in which the drive unit and the pallet unit are engaged.

As shown in FIG. 4, the lifter unit 55 includes the lifter cylinder 55a as a drive source, a cylinder mounting plate 551 for fixing the lifter cylinder 55a to the base plate 1, a rod mounting plate 552 connected to the distal end of the rod of the lifter cylinder 55a with the rod facing downward, guide post holders 553, 553 arranged at both ends of the cylinder mounting plate 551, and guide posts 554, 554 each slidably inserted into the corresponding guide post holder 553. The lower end of each guide post 554 is fixed to the rod mounting plate 552 and the upper end thereof is fixed to the lifter plate 55b.

The lifter plate 55b is further provided with the clamping claws cylinder 54b as the clamp drive unit 54 and the switching cylinder 52a for the switch drive unit 52 (see FIG. 8).

With this construction, when the lifter cylinder 55a operates, the clamp drive unit 54 to be described later engages with the clamping mechanism part 34 and the switch drive unit 52 engages with the switching mechanism part 32. Therefore, as shown in FIG. 4, the clamping mechanism part 34 and the switching mechanism part 32 can be operated by the operation of the lifter cylinder 55a.

As shown in FIG. 7, the clamp drive unit 54 includes a clamp arm drive unit 541 for operating the clamp arm mechanism 341, and a clamping claws drive unit 542 for operating the clamping claws mechanism 342.

The clamp arm drive unit 541 includes a clamp arm lifter drive unit 541a (lifter unit 55; see FIG. 4) for elevating the clamp arm 341a away from the connecting rod W, and the clamp arm rotation drive unit 541b for rotating the clamp arm 341a by 90 degrees.

The clamp arm lifter drive unit 541a elevates the clamp arm 341a using the lifter unit 55 (see FIG. 4). To be more precise, as shown in FIG. 7, the lifter plate 55b is elevated by the lifter cylinder 55a as the drive source so that the recessed engagement member 54c engages with the protruded engagement strip 341f. Elevating the clamp arm axle 341b against the urging force of the spring 341e causes the clamp arm 341a to be elevated.

As shown in FIGS. 7 and 8, the clamp arm rotation drive unit 541b includes the recessed engagement member 54c rotatably arranged on the lifter plate 55b and engageable with the protruded engagement strip 341f, a rotation lever 54d positioned below and coaxial with the recessed engagement member 54c, and a clamp arm rotation cylinder 54a coupled with the rotation lever 54d.

With this construction, extension and retraction of the rod of the clamp arm rotation cylinder 54a causes the clamp arm axle 341b to be rotated by 90 degrees, thereby moving the clamp arm axle 341b between the clamping position CR and the unclamping position UR (see FIG. 2).

Description will be given to the operation of the clamping apparatus for works.

As shown in FIG. 1, at the first station, a robot (not shown) supplies and loads a connecting rod W as a work on the pallet 31 where the positioning pin 4a is provided.

When loading the connecting rod W, the drive unit 5 positioned on the base plate 1 side is engaged with the pallet unit 3 positioned on the rotary table 2 side (see FIG. 4) and the clamp arm 341a is retained in the unclamping position UC (see FIG. 2) where the clamp arm 341a is positioned off and above the pallet 31. In the unclamping position UC, the clamping claws 342a are released and opened as shown in FIG. 9B.

Namely, when the lifter cylinder 55a (see FIG. 3) elevates the lifter plate 55b, the recessed engagement member 54c mounted on the lifter plate 55b engages with the protruded engagement strip 341f joined to the lower end of the clamp arm axle 341b and the clamp arm axle 341b is elevated against the urging force of the spring 341e, to thereby retain the clamp arm 341a in the upper position that is remote from the connecting rod W (see FIG. 7).

Further, the clamp arm rotation cylinder 54a rotates the clamp arm axle 341b through the rotation lever 54d and retains the same in the unclamping position UC where the clamp arm 341a becomes parallel to the connecting rod W. Furthermore, the clamping claws cylinder 54b pushes the clamp rod 342c to thereby retain the clamping claws 342a in a released state. As described above, the connecting rod W is loaded while the clamp arm 341a and the clamping claws 342a are released.

As shown in FIG. 5, because the positioning pin 4a is urged by the spring 331a in such a direction to be inserted into the connecting rod W, the positioning pin 4a protrudes from the movable pallet 31b. With respect to the positioning pin 4a the robot (not shown) inserts the small-end hole W21 of the connecting rod W as the work so that the work W is placed on the pallet 31.

Operation for switching kinds or types of the work W will be described mainly with reference to FIG. 5. In order to switch the kinds or types of the work W, it is necessary to disengage the locking pin 381 from the rotating ring 321 to rotate the movable pallet 31b, so that one of the positioning pins 4a, 4b, and 4c (see FIG. 2) corresponding to the desired kind or type is positioned in the reference position G of the small-end hole W21.

To this end, the robot (not shown) presses down the head portion 382a of the operation pin 382 to move down the locking pin 381 which is joined to the operation pin 382 through the plate 383, thereby disengaging the engagement between the rotating ring 321 and the ring holder 322. Further, when the switching cylinder 52a actuates and the rack 523 is reciprocated in the to-and-fro direction, the protruded engagement strip 324 and thus the movable pallet 31b rotates to thereby switch between the positioning pins 4a, 4b, and 4c.

When switching of the positioning pins 4a, 4b, and 4c is completed, the robot (not shown) by which the head portion 382a of the operation pin 382 is pressed down releases the operation pin 382, so that the locking pin 381 is moved up due to the returning action of the spring 384. The rotating ring 321 is then locked by the locking pin 381, and thereafter, the work W is loaded.

In order to prevent an interference of the connecting rod W or the robot (not shown) with the positioning pin 4a and as the result the positioning pin 4a from being pulled out upon loading of the connecting rod W, the roller 335 is supported by a roller retainer 55c provided on the lifter plate 55b (see FIG. 5).

When the connecting rod W is loaded, the subsequent operation to clamp the connecting rod W is initiated.

At first, as shown in FIG. 7, the recessed engagement member 54c is rotated by the clamp arm rotation cylinder 54a so that the clamp arm 341a is rotated by 90 degrees to the clamping position CR (see FIG. 2) where the clamp arm 341a is positioned orthogonally to the connecting rod W. In this position, the lifter cylinder 55a is actuated to move down the lifter plate 55b. The engagement between the drive unit 5 and the pallet unit 3 is thereby disengaged.

By this operation, the clamp arm axle 341b that has been urged upward by the lifter cylinder 55a through the protruded engagement strip 341f is subject to the urging force of the spring 341e that urges the clamp arm axle 341b downward, and the clamp arm 341a moves down to press and clamp the connecting rod W from above the connecting rod W (see FIG. 3).

Further, as shown in FIG. 9A, when the clamping claws cylinder 54b actuates and the cylinder rod thereof retracts, the thrust that has upwardly urged the clamp rod 342c coupled with the hinge pin 342b for the clamping claws 342a is released. Therefore, the returning force of the spring 342d acts in a direction to close the clamping claws 342a, and so the clamping claws 342a clamps the big-end portion W1 of the connecting rod W.

As described above, the clamp drive unit 54 is engageable with the pallet unit 3 to operate the clamping mechanism part 34 for unclamping with the clamping claws 342a, and therefore the connecting rod W can be held by the pressing forces of the springs 341e and 342d (see FIG. 7) while the engagement between the clamp drive unit 54 and the pallet unit 3 is disengaged.

With this construction, there are no drive sources provided on the rotary table 2 side, which enables the mechanism on the rotary table 2 side to be downsized as well as prevents the drawbacks of the drive source due to cutting fluid or the like upon processing.

Further, according to this preferred embodiment, as shown in FIGS. 1 and 3, the clamp drive unit 54 and the switch drive unit 52 are engageable with the pallet unit 3 only at the loading/unloading station, and there are no clamp drive unit 54 and switch drive unit 52 provided at other stations. Therefore, the connecting rod W is rotatively fed to the respective stations while being clamped by the pressing forces of the springs 341e and 342d (see FIG. 7).

With this construction of the clamping apparatus, there is no need to provide a clamp drive unit 54 and a switch drive unit 52 at other stations, which contributes to downsize the whole apparatus as well as to eliminate the drawbacks of the drive source due to cutting fluid or the like upon processing.

Next, deburring of the oil hole is carried out from the inner diameter side of the small-end hole W21 at the sixth station. Therefore, it is necessary to pull out the positioning pin 4a from the small-end hole W21 while the connecting rod W is clamped.

For this reason, as shown in FIG. 10, when the roller 335 provided below the guide pin 332 reaches the sixth station by the rotation of the rotary table 2, the engagement member 531 is positioned to stand by for the engagement with the roller 335. The engagement member driving cylinder 53a is then actuated to pull down the roller 335 while the roller 335 and the engagement member 531 are engaged each other. The positioning pin 4a is pulled out from the connecting rod W while the connecting rod W is held by the clamp arm 341a, and deburring process is carried out (see FIG. 11).

When the processing at the sixth station is completed, the roller 335 is moved to the next station by the rotation of the rotary table 2, and the engagement between the roller 335 and the engagement member 531 is released. The positioning pin 4a is again inserted into the connecting rod W.

At the eighth station, cleaning of the oil hole to be processed in the small-end hole W21 is carried out from the inner diameter side of the small-end hole W21. A similar operation to the sixth station is carried out and insertion/pulling out of the positioning pin 4 is performed.

At the unloading station to be of the final station, the connecting rod W is unclamped and released, and thereafter the robot (not shown) unloads the connecting rod W.

Therefore, the lifter plate 55b is elevated by the lifter cylinder 55a so that the recessed engagement member 54c provided on the lifter plate 55b engages with the protruded engagement strip 341f joined to the lower end of the clamp arm axle 341b, thereby urging the clamp arm axle 341b to the upward direction against urging force of the spring 341e. The clamp arm 341a is thereby elevated away from the connecting rod W (see FIG. 7). Further, the recessed engagement member 54c is rotated by the clamp arm rotation cylinder 54a so that the clamp arm 341a rotates by 90 degrees to the unclamping position UC (see FIG. 2) where the clamp arm 341a becomes parallel to the connecting rod W. Furthermore, the clamp rod 342c is pressed by the clamping claws cylinder 54b to release the clamping claws 342a from the connecting rod W (see FIG. 9A).

Because the unloading station is provided at the same station with the first station, unloading the connecting rod W and loading another connecting rod W are carried out without pulling out the positioning pin 4a.

While the present invention has been described in detail with reference to a preferred embodiment thereof, the present invention is not limited to this specific embodiment and various changes and modifications may be made without departing from the scope of the attached claims.

For example, the clamp drive unit, the switch drive unit, and the lifter unit are operated by cylinders as drive sources. These may be air cylinders or hydraulic cylinders. Further, a link mechanism, a feed screw mechanism, gears or the like may be used with a servo motor, etc. as a drive source. In the preferred embodiment, coil springs are employed as the springs. However, the springs are not limited to the coil springs, and other known elastic materials such as rubber and urethane foam may be used.

According to the preferred embodiment, switching of the positioning pins is carried out by rotating the movable pallet which is rotatably supported by the rotary table. However, the present invention is not limited to this specific embodiment. The movable pallet may be slidably supported, and by means of a feed screw mechanism or the like the movable pallet may be slid to switch over the positioning pins.

What is claimed is:

1. A clamping apparatus for works comprising:
   a base;
   a rotary table which is rotatable relative to the base and rotatively moved to one station after another for various processes; and
   a pallet unit which is arranged in accordance with the processes and holds a work having a reference hole, wherein the pallet unit further comprising:

a pallet which is provided with a plurality of positioning pins each to be inserted into the reference hole and corresponding to a plurality of kinds or types, and onto which the work is placed;

a clamping mechanism part which holds the work by a pressing force of a spring; and a switching mechanism part which performs switching between the plurality of positioning pins, wherein the base is equipped with a clamp drive unit for operating the clamping mechanism part, a switch drive unit for operating the switching mechanism part, and a lift unit for moving the clamp drive unit and the switch drive unit toward and away from the pallet unit to engage with or disengage from the pallet unit.

2. A clamping apparatus for works according to claim 1, wherein the clamp drive unit and the switch drive unit are engaged with or disengaged from the pallet unit at a loading/unloading station for the works.

3. A clamping apparatus for works according to claim 1, further comprising:

a holder which supports the positioning pins on the pallet such that one of the positioning pins is inserted into or pulled out from the reference hole of the work;

a support spring for urging the holder in a direction where the positioning pin is inserted into the reference hole of the work;

an engagement strip joined to or extending from the holder;

an engagement member arranged at the base to be engageable with the engagement strip at a predetermined station; and an engagement member drive unit coupled with the engagement member and mounted on the base, the engagement member drive unit moving the engagement member in a direction to pull out the positioning pin from the reference hole.

4. A clamping apparatus for works according to claim 1, wherein the pallet further comprises a movable pallet for receiving that portion of the work which has the reference hole, and a stationary pallet for receiving that portion of the work which does not have the reference hole, and wherein the plurality of positioning pins are provided at the movable pallet.

5. A clamping apparatus for works according to claim 1, wherein the work is a connecting rod, and the reference hole of the work is a small-end hole of the connecting rod.

6. A clamping apparatus for works according to claim 1, wherein the clamping mechanism part includes a clamp arm for urging and holding the work against the pallet by a pressing force of a spring, and clamping claws for clamping and holding the work by a pressing force of a spring so as to prevent a rotation of the work around the reference hole as a rotation axis.

7. A clamping apparatus for works according to claim 1, wherein the switching mechanism part supports the plurality of positioning pins rotatably on a circle and has an engagement strip which is rotatable together with the plurality of positioning pins, and wherein the switch drive unit comprises an engagement member which is engageable with the engagement strip, and a switch drive source for rotating the engagement member.

* * * * *